(12) United States Patent
Knörzer et al.

(10) Patent No.: US 6,674,214 B1
(45) Date of Patent: Jan. 6, 2004

(54) ELECTRIC AXIAL FLOW MACHINE

(75) Inventors: Karl-Heinz Knörzer, Vogtsburg/Achkarren (DE); Herbert Von König, Osterode am Harz (DE)

(73) Assignee: Perm Motor GmbH, Breisach (DE)

( * ) Notice: Subject to any disclaimer, the term of this patent is extended or adjusted under 35 U.S.C. 154(b) by 9 days.

(21) Appl. No.: 10/009,636

(22) PCT Filed: Aug. 4, 2000

(86) PCT No.: PCT/CH00/00417

§ 371 (c)(1),
(2), (4) Date: Dec. 14, 2001

(87) PCT Pub. No.: WO01/11755

PCT Pub. Date: Feb. 15, 2001

(30) Foreign Application Priority Data

Aug. 9, 1999 (CH) .................................. 1469/99

(51) Int. Cl.⁷ .................................................. H02K 1/22
(52) U.S. Cl. ........................................ 310/268; 310/268
(58) Field of Search ................................ 310/268, 156, 310/271

(56) References Cited

U.S. PATENT DOCUMENTS

| | | | | |
|---|---|---|---|---|
| 3,558,950 A | * | 1/1971 | Raybould | .................... 310/271 |
| 4,093,897 A | * | 6/1978 | Fujita | .......................... 218/138 |
| 4,629,920 A | | 12/1986 | Hermann | |
| 4,864,175 A | | 9/1989 | Rossi | |
| 5,619,087 A | * | 4/1997 | Sakai | .......................... 310/268 |
| 6,011,337 A | | 1/2000 | Lin et al. | |

FOREIGN PATENT DOCUMENTS

| | | |
|---|---|---|
| DE | 298 16 561 | 4/1999 |
| GB | 2 296 997 | 7/1996 |
| JP | 59-35556 | 2/1984 |

* cited by examiner

Primary Examiner—Nestor Ramirez
Assistant Examiner—Iraj A. Mohandesi
(74) Attorney, Agent, or Firm—Leydig, Voit & Mayer, Ltd.

(57) ABSTRACT

An electric axial flow machine includes an ironless disk-shaped rotor arranged on a machine shaft and having permanent magnets embedded in a fiber- or fabric-reinforced plastic, and, on both sides, next to the rotor, a stator, wherein the permanent magnets are each joined to the surrounding fiber- or fabric-reinforced plastic so that the permanent magnets and the machine shaft form a dimensionally stable unit.

20 Claims, 4 Drawing Sheets

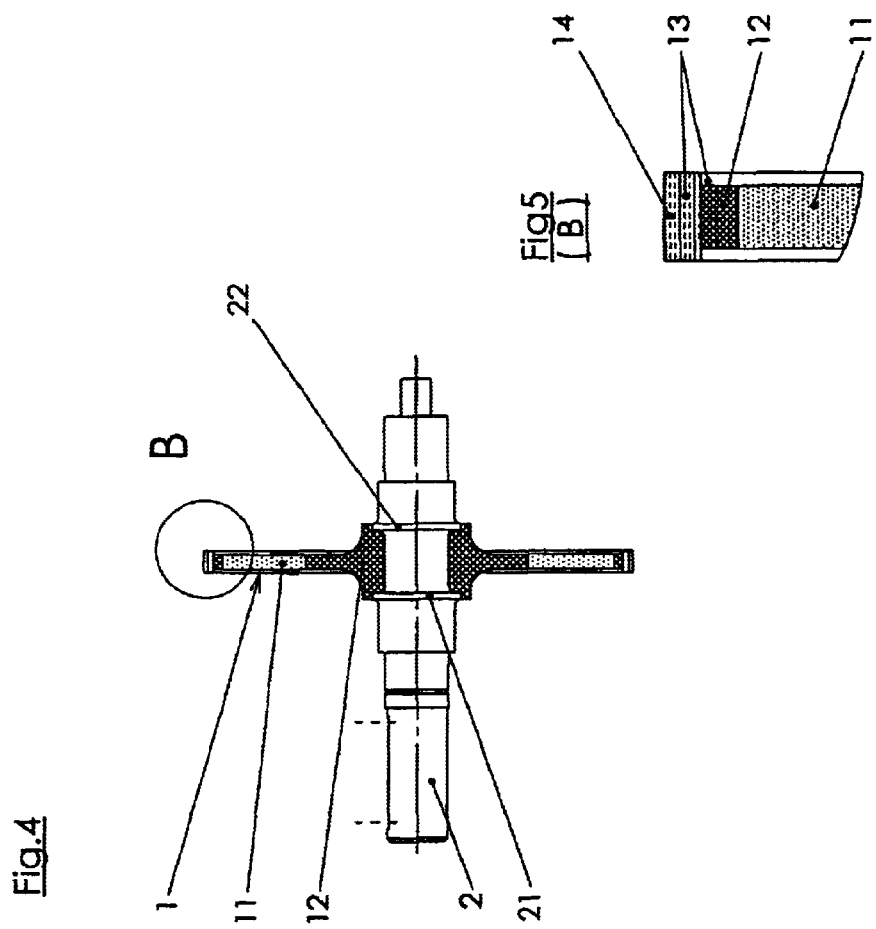
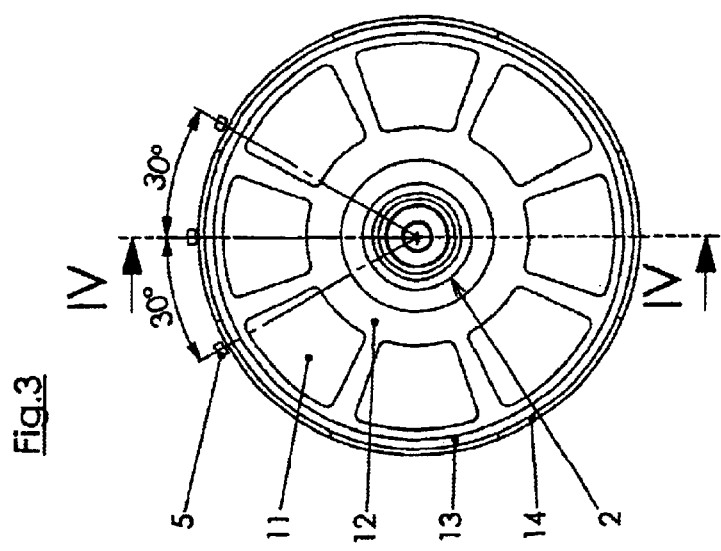

ELECTRIC AXIAL FLOW MACHINE

The present invention relates to an electric axial flow machines as defined in the precharacterizing clause of the independent patent claim 1.

BACKGROUND

1. Field of the Invention

An electric axial flow machine is understood as meaning a motor or generator with a rotor and a stator, in which the magnetic flux between the rotor and the stator is parallel to the axis of rotation of the rotor. Axial flow machines of this type are also known by the designations brushless DC motor, permanent-magnet synchronous motor or disk-armature motor.

An efficient brushless DC motor with an ironless rotor arranged around a shaft and having permanent magnets is described for example in DE-U-298 16 561. In the case of this DC motor, arranged around the shaft on both sides of the disk-shaped rotor, and parallel to the rotor, there is in each case an electromagnet unit as a stator. The rotor has permanent magnets which are arranged in a circular manner around the shaft, are embedded for example in a plastic and the direction of magnetization of which runs parallel to the shaft. Two neighboring permanent magnets respectively have a reversed direction of magnetization. One stator is provided with first electromagnetic regions and the other stator is provided with second electromagnetic regions, the number of which corresponds to the number of permanent magnets, two neighboring first electromagnetic regions and two neighboring second electromagnetic regions in each case having reversed directions of magnetization, which are changed alternately. The first and second electromagnetic regions are arranged offset in relation to one another and have a phase difference of 90°.

One disadvantage of this DC motor is that the rotor is, by its nature, relatively unstable and therefore suitable only for slow rotations.

U.S. Pat. No. 5,619,087 discloses an electric axial flow machine which comprises at least two ironless disk-shaped rotors with relatively small, bar-shaped permanent magnets, which are embedded in a fiber- or fabric-reinforced plastic. A plurality of like-magnetized permanent magnets arranged next to one another respectively form a group, which forms one magnetic pole. The fact that many relatively small permanent magnets are arranged in the plastic instead of a number of large magnets has the effect of reducing the effective magnetic area, and consequently the magnetic flux, which is compensated by the use of at least two rotors. Furthermore, the anchoring of the many individual permanent magnets in the plastic presents problems in terms of production and strength.

SUMMARY OF THE INVENTION

In view of the disadvantages of the previously known axial flow motors and generators, the invention is based on the following object. The aim is to provide an electric axial flow machine, the rotor of which is as low in mass and inertia as possible, but nevertheless stable and also suitable for high rotational speeds.

An important feature of the invention is that, in an electric axial flow machine with an ironless disk-shaped rotor which is arranged on a machine shaft and has permanent magnets which are embedded in a fiber- or fabric-reinforced plastic, the permanent magnets are each joined with a positive fit to the surrounding fiber- or fabric-reinforced plastic and the latter, together with the permanent magnets and the machine shaft, forms a dimensionally stable unit. Arranged next to the rotor on both sides there is in each case a stator.

The mere fact that the plastic is fiber- or fabric-reinforced means that the rotor has great rigidity. This is further increased by the fact that the permanent magnets are each joined with a positive fit to the surrounding fiber- or fabric-reinforced plastic and the latter, together with the permanent magnets and the machine shaft, forms a dimensionally stable unit. The latter can be achieved by suitable arrangement of the permanent magnets and the machine shaft and molding of the fiber- or fabric-reinforced plastic. The design of the rotor according to the invention makes the rigid permanent magnets serve at the same time as stiffening elements, it being ensured by the positive connection with the surrounding plastic that the permanent magnets do not become detached.

A plurality of permanent magnets are advantageously arranged in a circular manner around the machine shaft, and the plastic, in particular a thermosetting material, advantageously extends between the permanent magnets altogether over at least 10%, preferably between 15% and 20%, of the circle. By arranging and embedding the permanent magnets in such a way, the rotor can be optimally designed with regard to strength and efficiency.

BRIEF DESCRIPTION OF THE DRAWING FIGURES

The axial flow machine according to the invention is described in more detail below on the basis of an exemplary embodiment with reference to the attached drawings, in which:

FIG. 3 shows the rotor with machine shaft and with means for determining the magnetic pole position of the rotor in a side view;

FIG. 4 shows the rotor including the machine shaft in a partial sectional view along the line IV—IV in FIG. 3;

FIG. 5 shows an enlarged view of a detail of the rotor from FIG. 4;

DETAILED DESCRIPTION

Figure 2:
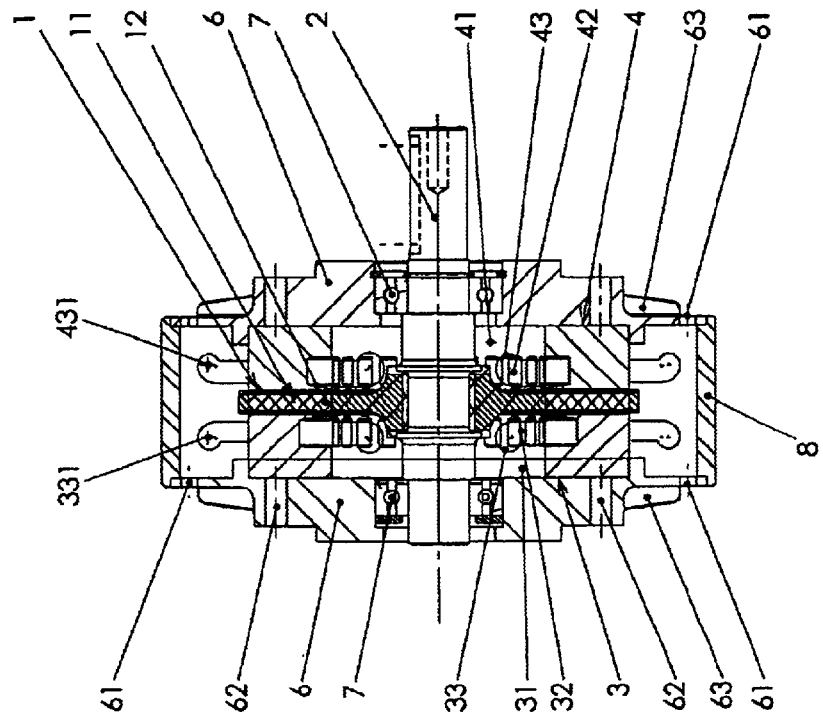
FIG. 2 shows the axial flow machine in a partial sectional view along the line II—II in FIG. 1.
Figure 1:
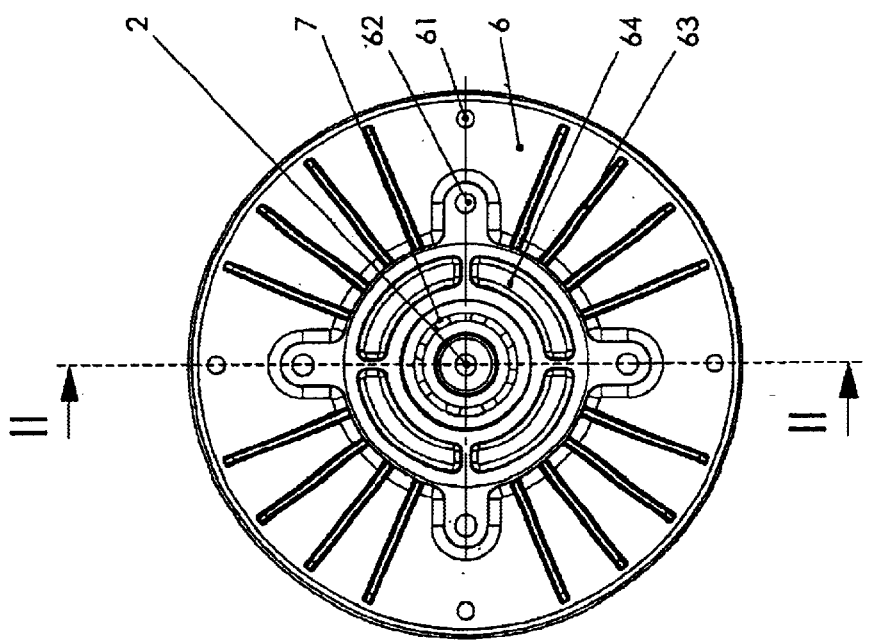
FIG. 1 shows an axial flow machine according to the invention in a side view.

FIGS. 1 and 2

The axial flow machine according to the invention which is shown comprises a disk-shaped rotor 1, which is securely connected to a machine shaft 2 and has permanent magnets 11, which are embedded in a fiber-reinforced plastic 12, for example a thermosetting material. Arranged on both sides of the rotor 1 there is in each case, parallel to the latter, an annular stator 3 and 4, which is respectively fastened to a bearing plate 6. The stators 3, 4 each have an annular yoke 31 and 41 with slots 32 and 42 on their sides facing the rotor 1, in which slots multi-phase windings 33 and 43 which have external winding overhangs 331 and 431 are led. The bearing plates 6 are preferably made of aluminum and also have stiffening and cooling ribs 63, with the result that the heat generated is dissipated well. Clearances 64 in the bearing plates 6 have the purpose of reducing the weight. For mounting the bearing plates 6, bolt holes 61 are provided, while threaded holes 62 serve for fastening them on a machine part, not shown, for example a gear mechanism. The bearing plates 6 and an annular casing part 8 together form a casing for the rotor 1 and the stators 3, 4. The machine shaft 2 is rotatably mounted on the bearing plates 6 by means of ball bearings 7.

The two stators 3, 4 are electrically offset in relation to one another in the circumferential direction by 180°, with the result that the corresponding magnetic fluxes produced in the circumferential direction in the rotor 1 are oppositely oriented and consequently cancel one another out in practice, at least for the most part. This makes it possible to dispense with an iron in the rotor 1.

The following statement applies to the entire further description. If reference numerals are contained in a figure for the purpose of elucidating the drawing but are not mentioned in the directly associated text of the description, or vice versa, reference is made to their explanation in previous descriptions of figures.

FIGS. 3 to 5

According to the invention, the rotor 1 and the machine shaft 2 form a dimensionally stable unit. The ironless disk-shaped rotor 1 has eight permanent magnets 11, which are circumferentially arranged, in a circle, around the machine shaft 2 and are embedded in the fiber-reinforced plastic 12. The fiber-reinforced plastic 12 extends between the permanent magnets 11, altogether over between approximately 15% and 20% of the circle, to be precise, in uniform webs. In this way, there is sufficient fiber-reinforced plastic 12 between the mechanically very rigid permanent magnets 11 for the rotor 1 to be stable, and a rotor 1 with the smallest possible mass moment of inertia is achieved with the greatest economy, in terms of production cost.

The machine shaft 2 is also embedded in a central region in the fiber-reinforced plastic 12, two flanges 21 and 22 providing a stable connection between the rotor 1 and the machine shaft 2.

For absorbing the centrifugal forces, attached to the outer circumference of the rotor 1 is a stiffening band 13, which comprises preimpregnated fibrous material, which preferably contains glass, carbon or Kevlar fibers predominantly aligned in the circumferential direction. The stiffening band 13 is wider than the permanent magnets 11 and the fiber-reinforced plastic 12, which can be clearly seen in particular in FIG. 5. It is advantageous for stiffening purposes for the fiber-reinforced plastic 12 and the permanent magnets 11 also to be formed such that they become thicker from the inside outward.

Adhesively attached on the outside around the stiffening band 13 is a magnetic strip 14, which forms a radially magnetized series of magnetic poles, which are respectively arranged in a way corresponding to the permanent magnets 11 embedded in the fiber-reinforced plastic 12, although 100% of the circumference is covered. This magnetic strip 14 makes it possible to determine the magnetic pole position of the rotor 1 at the periphery by means of three fixed-in-place Hall probes 5. The three Hall probes 5 are spaced apart from one another in the circumferential direction by 30° each and are arranged for example on a printed circuit, which is fastened to the casing part 8. The determined magnetic pole position allows the firing angle for the multi-phase windings 33, 43 of the stators 3, 4 to be optimally set.

The permanent magnets 11 preferably consist of sintered magnetic material, for example NdFeB, with a flexural strength of approximately 270 N/mm$^2$ and a modulus of elasticity of approximately 150 kN/mm$^2$. The fiber-reinforced plastic 12 is, for example, an epoxy resin or an imide resin with glass fiber reinforcement. The mechanical strength values achieved here too lie in the range of steel 37. The heat resistance for the epoxy resin lies around 200° C. and for the imide resin lies around 250° C. For better thermal expansion and thermal conductivity, mineral substances may be additionally added to the resin.

To produce the rotor 1, the machine shaft 2 and the permanent magnets 11 are arranged in a mold and the pre-heated fiber-reinforced plastic is subsequently poured under pressure into the mold, which is heated. Depending on the resin, the pouring-in of the fiber-reinforced plastic takes place at a temperature of at least 200° C. or at least 250° C. and under a pressure of 500–1500 bar. This causes plastication, which ensures complete filling of the mold and a good positive fit with the permanent magnets 11 and the machine shaft 2.

Figure 6:
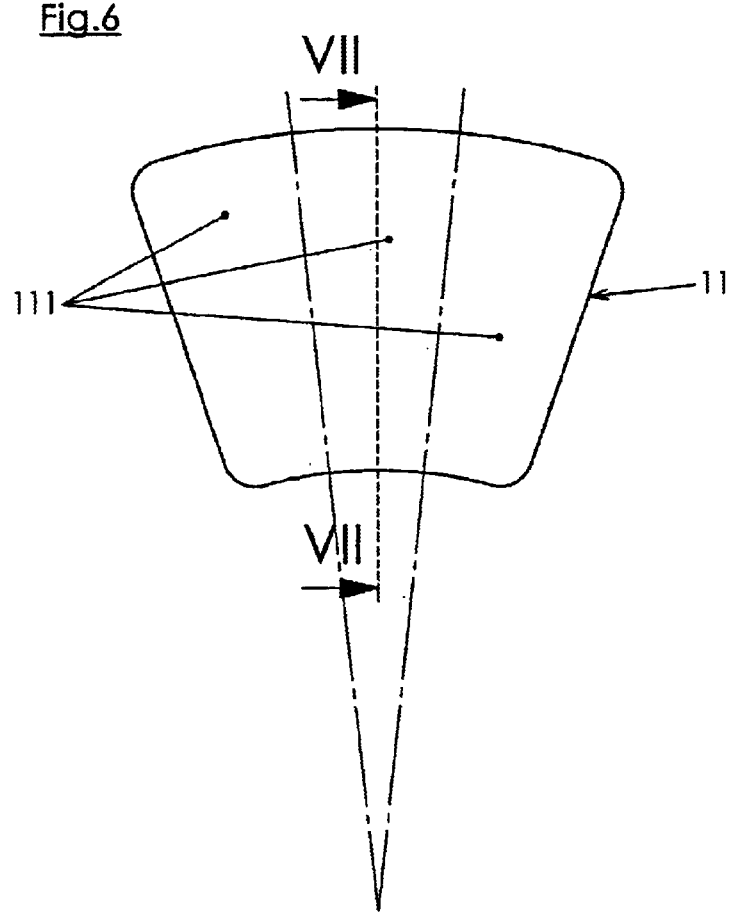
FIG. 6 shows a plan view of a segmented permanent magnet.
Figure 7:
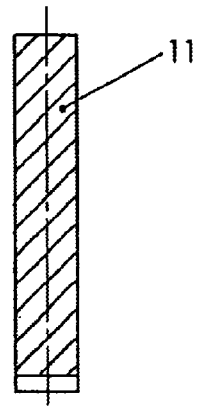
FIG. 7 shows a sectional view of the segmented permanent magnet along the line VII—VII in FIG. 6.

FIGS. 6 and 7

In the case of the present exemplary embodiment, the permanent magnets 11 respectively comprise three separate magnet segments 111 next to one another in the circumferential direction. This allows the eddy current losses to be reduced. The magnet segments 111 are preferably joined by means of a metal adhesive, but may also be held together only by the fiber-reinforced plastic 12.

Figure 8:
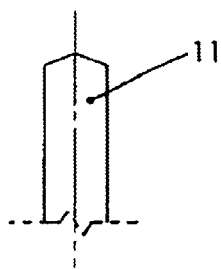
FIG. 8 shows a permanent magnet with a first special contour for the positive connection with the surrounding plastic.
Figure 9:
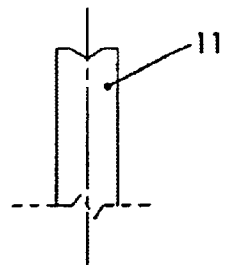
FIG. 9 shows a permanent magnet with a second special contour for the positive connection with the surrounding plastic.

FIGS. 8 and 9

Since a great intrinsic rigidity of the rotor 1 is essential at high rotational speeds and with relatively small air gaps between the rotor 1 and the stators 3, 4, the permanent magnets 11 are each joined with a positive, i.e., interference, fit to the surrounding fiber-reinforced plastic 12. Shown in FIGS. 8 and 9 are two possible magnet contours, which are suitable for absorbing the shearing forces that occur in the rotor. The generally planar magnets shown in plan and side views in FIGS. 6 and 7 are shown in partial side views in FIGS. 8 and 9. The permanent magnet 11 in FIG. 8 includes a projection in the form of a ridge at the peripheral edge of the magnet. The projection is centrally located on the peripheral edge of the permanent magnet. The permanent magnet 11 shown in side view in FIG. 9 includes a recess in the peripheral edge. That recess is in the form of a v-shaped groove that is centrally located with respect to the peripheral edge of the permanent magnet.

In the case of the rotor 1 shown, it is possible to dispense with the attachment on both sides of magnetically conductive plates for holding the permanent magnets 11 or a similar kind of sandwich design, whereby the mass inertia, the amount of magnetic material and the surface losses can be kept low and undesired leakage paths between neighboring permanent magnets 11 can be avoided.

Figure 11:
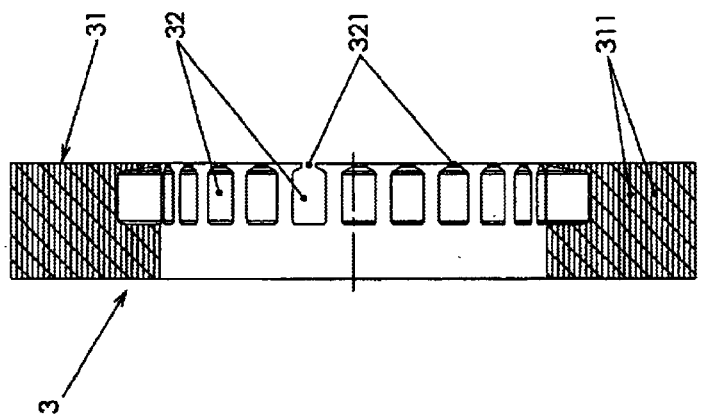
FIG. 11 shows a sectional view of the stator along the line XI—XI in FIG. 10.
Figure 10:
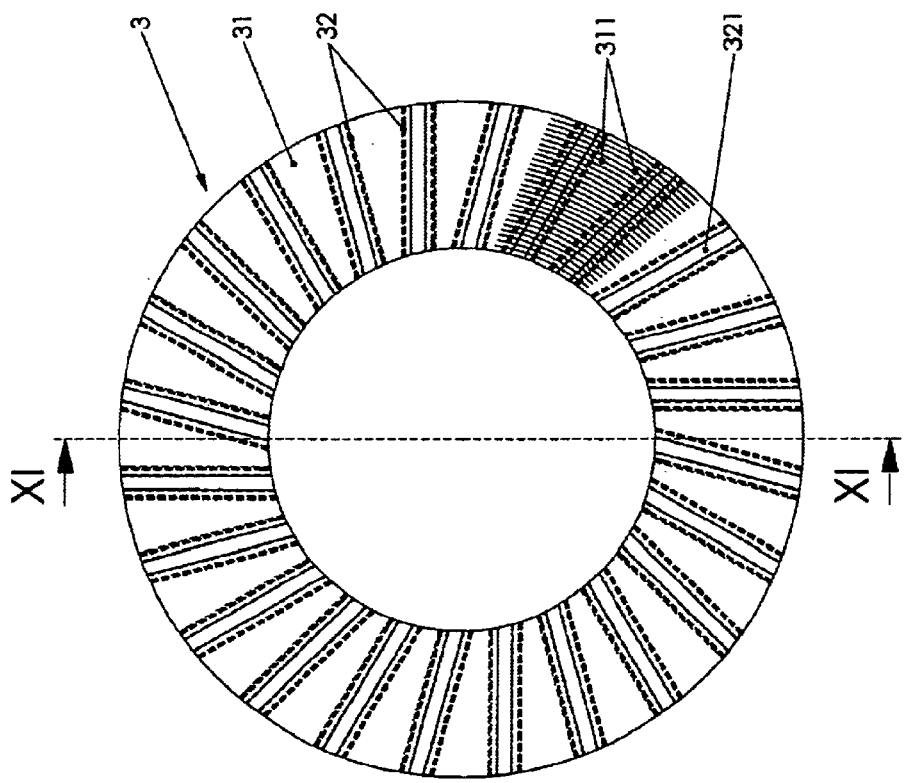
FIG. 10 shows a stator in a side view.

FIGS. 10 and 11

The construction of the two stators 3, 4 is explained below on the basis of the example of the stator 3. The stator 3 comprises an annular yoke 31, in which slots 32 extending approximately radially from the inside outward have been made. The yoke 31 is made up of a plurality of layers 311 of high-quality dynamo sheet, which are rolled during the slot punching to form assemblies and are subsequently connected by a weld point. The slots 32 are relatively wide in the interior of the yoke 32, but toward the rotor 1 have a relatively narrow opening 321.

As shown in FIG. 2, multi-phase windings 33, for example three-phase windings, are led through the slots 32. Accommodating the multi-phase windings 33 in the slots 32 allows the stator 3 to be brought close to the permanent magnets 11 of the rotor 1, i.e. there is a very small air gap, which has the consequence of a very high magnetic flux and consequently a very great power density.

On account of a transposing of the slots 32 in the circumferential direction and with respect to the permanent magnets 11 of the rotor 1, latching moments and noises can be minimized.

Further design variations can be realized in respect of the axial flow machine described above. The following are also expressly mentioned here:

The determination of the magnetic pole position of the rotor 1 does not necessarily have to take place by means of the magnetic strip 14 and the Hall probes 5. Also conceivable, inter alia, is an optical scanning of light and dark regions on the periphery of the rotor 1.

Instead of transposing the slots 32, and consequently the multi-phase windings 33 led in them, the permanent magnets 11 may also be transposed.

Instead of being fiber-reinforced, the plastic 12 of the rotor 1 may also be fabric-reinforced.

What is claimed is:

1. An electric axial flow machine including an ironless disk-shaped rotor arranged on a machine shaft and having permanent magnets embedded in a fiber- or fabric-reinforced plastic, and, on both sides, next to the rotor, a stator, wherein the permanent magnets are each embedded in and joined at least peripherally in an interference fit with the fiber- or fabric-reinforced plastic so that the permanent magnets and the machine shaft form a dimensionally stable unit.

2. The electric axial flow machine as claimed in claim 1, wherein the permanent magnets are arranged circumferentially, in a circle, around the machine shaft and the fiber- or fabric-reinforced plastic extends between the permanent magnets over at least 10% of the circle.

3. The electric axial flow machine as claimed in claim 1, wherein the rotor has on an outer circumference, or proximate the outer circumference, a stiffening band comprising preimpregnated fibrous material, the rotor becoming thicker with increasing distance from the machine shaft.

4. The electric axial flow machine as claimed in claim 1, comprising means for determining magnetic pole position of the rotor including a magnetic strip arranged on an outer circumference of the rotor and having a radially magnetized series of magnetic poles arranged in correspondence to the permanent magnets embedded in the fiber- or fabric-reinforced plastic, and fixed-in-place Hall probes interacting with the magnetic poles.

5. The electric axial flow machine as claimed in claim 1, wherein the fiber- or fabric-reinforced plastic comprises an epoxy resin or an imide resin with glass fiber reinforcement.

6. The electric axial flow machine as claimed in claim 1, wherein the permanent magnets respectively comprise at least two separate magnet segments contiguous to one another, in a circumferential direction, joined by a metal adhesive.

7. The electric axial flow machine as claimed in claim 1, wherein the stator comprises an annular yoke including slots extending approximately radially, relative to the machine shaft, and through which multi-phase windings pass.

8. The electric axial flow machine as claimed in claim 7, wherein the permanent magnets are obliquely arranged, relive to radii of the machine shaft, along a circumferential direction.

9. The electric axial flow machine as claimed in claim 1, including two stators electrically offset in relation to one another in a circumferential direction by 180° so that magnetic fluxes in the circumferential direction in the rotor are oppositely oriented and essentially cancel one another.

10. A method for producing an ironless disk-shaped rotor for arrangement on a machine shaft of an electric axial flow machine and having permanent magnets embedded in a fiber- or fabric-reinforced plastic, including placing the machine shaft and the permanent magnets in a mold, heating the mold, and injecting a pre-heated fiber- or fabric-reinforced plastic under pressure into the heated mold to establish an interference fit between the permanent magnets and the fiber- or fabric-reinforced plastic.

11. The method as claimed in claim 10, including injecting the fiber- or fabric-reinforced plastic at a temperature of at least 200° C. and under a pressure of 500–1500 bar.

12. The electric axial flow machine as claimed in claim 7, wherein the slots are obliquely arranged, relative to radii of the machine shaft, along a circumferential direction.

13. The electric axial flow machine as claimed in claim 1, wherein the permanent magnets are generally planar and include peripheral edges having recesses filled with the fiber- or fabric-reinforced plastic, forming the interference fit.

14. The electric axial flow machine as claimed in claim 13, wherein the recesses are grooves.

15. The electric axial flow machine as claimed in claim 1, wherein the permanent magnets are generally planar and include peripheral edges having projections extending into the fiber- or fabric-reinforced plastic, forming the interference fit.

16. The electric axial flow mache as claimed in claim 15, wherein the projections are ridges.

17. The method as claimed in claim 10, wherein the permanent magnets are generally planar and include peripheral edges having recesses, including injecting the pre-heated the fiber- or fabric-reinforced plastic into the recesses to form the interference fit between the permanent magnets and the fiber- or fabric-reinforced plastic.

18. The method as claimed in claim 17, wherein the recesses are grooves.

19. The method as claimed in claim 10, wherein the permanent magnets are generally planar and include peripheral edges having projections and including injecting the pre-heated fiber- or fabric-reinforced plastic so that the projections form the interference fit between the pennant magnets and the fiber- or fabric-reinforced plastic.

20. The method as claimed in claim 19, wherein the projections are ridges.

* * * * *